(12) United States Patent  
Confer et al.

(10) Patent No.: US 8,148,491 B2
(45) Date of Patent: Apr. 3, 2012

(54) PREPARATION OF POLYTRIMTHYLENE ETHER GLYCOL OR COPOLYMERS THEREOF

(75) Inventors: David C. Confer, Chadds Ford, PA (US); Mark Andrew Harmer, Landenberg, PA (US); Christian Hoffmann, Newark, DE (US); Scott Christopher Jackson, Wilmington, DE (US); Sigridur Soley Kristjansdottir, Wilmington, DE (US); Rupert Spence, Kingston (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 645 days.

(21) Appl. No.: 12/262,626

(22) Filed: Oct. 31, 2008

(65) Prior Publication Data

US 2009/0118465 A1    May 7, 2009

Related U.S. Application Data

(60) Provisional application No. 60/984,398, filed on Nov. 1, 2007.

(51) Int. Cl.
*C08F 6/06* (2006.01)
*C08F 6/12* (2006.01)
*C08J 3/11* (2006.01)
*C08G 65/34* (2006.01)

(52) U.S. Cl. ...... 528/503; 528/425; 528/499; 528/502 R

(58) Field of Classification Search .................. 528/425, 528/499, 502 R, 503
See application file for complete search history.

(56) References Cited

U.S. PATENT DOCUMENTS

| | | | |
|---|---|---|---|
| 2,520,733 A | 8/1950 | Morris et al. |
| 3,282,875 A | 11/1966 | Connolly et al. |
| 3,326,985 A | 6/1967 | Mason |
| 3,506,635 A | 4/1970 | Anderson |
| 4,329,435 A | 5/1982 | Kimoto et al. |
| 4,330,654 A | 5/1982 | Ezzell et al. |
| 4,358,545 A | 11/1982 | Ezzell et al. |
| 4,433,082 A | 2/1984 | Grot |
| 4,610,762 A | 9/1986 | Birdwell |
| 5,094,995 A | 3/1992 | Butt et al. |
| 5,824,622 A | 10/1998 | Harmer et al. |
| 6,720,459 B2 | 4/2004 | Sunkara et al. |
| 6,977,291 B2 | 12/2005 | Sunkara et al. |
| 2002/0007043 A1 | 1/2002 | Sunkara et al. |
| 2007/0123737 A1 | 5/2007 | Harmer et al. |

FOREIGN PATENT DOCUMENTS

WO    0144150 A    6/2001

OTHER PUBLICATIONS

U.S. Appl. No. 60/984,398, filed Nov. 1, 2007, Mark Andrew Harmer et al.
G. A. Olah et al., Superacids, 1985, John Wiley & Sons (Book Not Included).
J. D. Weaver et al., Supported Fluorocarbonsulfonic Acid Catalysts, Catalysis Today, 1992, vol. 14:195-210. M. A. Harmer et al., Synthesis and Applications of Superacids. 1,1,2,2-Tetrafluoroethanesulfonic Acid, Supported on Silica, Green Chemistry, 2007, vol. 9:30-37.
F. J. Waller et al., Catalysis With Nafion; Chemtech (1987), 17(7), pp. 438-441.
International Search Report, PCT International Application PCT/US2008/081997, May 11, 2009.

*Primary Examiner* — Duc Truong

(57) ABSTRACT

This invention relates to a process for preparing polytrimethylene ether glycols or copolymers thereof by a polycondensation reaction using at least one acid catalyst, wherein the temperature of the reaction is controlled such that the average temperature during the first half of the reaction is higher than the average temperature during the second half of the reaction.

20 Claims, 1 Drawing Sheet

PREPARATION OF POLYTRIMTHYLENE ETHER GLYCOL OR COPOLYMERS THEREOF

CROSS-REFERENCE TO RELATED APPLICATION

This application claims the benefit of U.S. Provisional Application No. 60/984398 filed on Nov. 1, 2007, which application is incorporated herein by reference.

FIELD OF INVENTION

This invention relates to a process for preparing polytrimethylene ether glycols or copolymers thereof.

TECHNICAL BACKGROUND

Polytrimethylene ether glycol, also known as polyoxytrimethylene glycol or poly(1,3-propylene glycol), can be produced from 1,3-propanediol. Polytrimethylene ether glycols have primary hydroxyl groups, low melting points and are highly flexible. These polymers are useful in many applications, such as the production of elastomeric polymers and textile fibers. Polytrimethylene ether glycols are typically produced by the acid-catalyzed polycondensation of 1,3-propanediol, optionally in the presence of comonomer diols, as described in U.S. Pat. Nos. 6,977,291, 3,326,985 and 2,520,733.

It is known that polytrimethylene ether glycols produced by this acid-catalyzed polycondensation reaction can have quality problems, in particular a high percentage of unsaturated end groups and high color.

Since polytrimethylene ether glycols suitable for use as soft segment in elastomeric polymers such as polyurethanes must be capable of reacting with other monomers such as diisocyanates, it is required that they possess a high dihydroxy terminal functionality and especially a low percentage of unsaturated end groups. In addition, polytrimethylene ether glycols or copolymers thereof with high unsaturation are not acceptable for many end-uses, such as textile fiber applications as the unsaturated molecules either cause an undesired termination in polymerization reactions that use polytrimethylene ether glycol as a reaction component or the unsaturated molecules are not incorporated into the polymer at all, both leading to undesired polymer properties. The degree of unsaturation of the polymer depends primarily on reaction temperature, catalyst type, catalyst concentration and reaction time.

As described in U.S. Pat. No. 3,326,985, attempts to prepare higher molecular weight polytrimethylene ether glycols and copolymers thereof having a low content of unsaturated end groups have either been unsuccessful or required very long reaction times under mild reaction conditions. It was found that to produce polytrimethylene ether glycols having an average molecular weight of from 1000 to 1500 g/mole and a low content of unsaturated end groups, undesirably long reaction times were required. Attempts to shorten the reaction time by employing higher temperatures and/or larger concentrations of catalyst resulted in polymers of high unsaturation.

U.S. Pat. No. 3,326,985 disloses a method for producing polytrimethylene ether glycols of a molecular weight between 1200 and 1400 g/mole with unsaturation of about 20 meq/kg. This was achieved by using polytrimethylene ether glycols of a lower molecular weight and employing a process comprising vacuum stripping at high temperature (about 220-240° C.) and low pressure (about 0.1 to 1.1 kPa). This process contains several limitations, e.g., (1) the process yields a product with high unsaturation (about 20 meq/kg), (2) the molecular weight achieved is limited to a narrow range of 1200-1400 g/mole, (3) the process results in a significant yield loss caused by stripping off a volatile fraction and (4) the process requires costly vacuum-rated equipment and a vacuum pump to achieve the low pressure required.

Acid catalyzed polymerizations generally depend upon a complex number of factors, such as the nature of the reaction, catalyst type, catalyst concentration, solvent effects such as water content and reaction temperature. Higher temperatures generally favor shorter reaction times which is preferable from a practical point of view. However, higher temperatures also favor side product formation, especially formation of unsaturated end groups and color. The present invention discloses the unexpected finding that a reaction product having low unsaturation, and, in some embodiments, lower color, can be produced at a high reaction rate.

SUMMARY

The present invention provides a process for producing a reaction product comprising at least one polytrimethylene ether glycol or copolymer thereof, said reaction product having a number-average molecular weight of at least about 450 g/mole, comprising:

(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst, whereby a reaction mixture is produced over a reaction time; and (b) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time; whereby a reaction product is produced.

The at least one polycondensation catalyst can be any acid catalyst. In a more specific embodiment, the at least one polycondensation catalyst is selected from the group consisting of inorganic acids, organic sulfonic acids including fluoroalkylsulfonic acids, metal salts, zeolites, fluorinated alumina, acid-treated alumina, heteropolyacids, heteropolyacids supported on zirconia, titania, alumina and/or silica, and ion exchange-based solid acid catalysts.

The reaction product can exhibit reduced terminal unsaturation and reduced color.

DETAILED DESCRIPTION

The present invention provides a process for preparing a reaction product comprising at least one polytrimethylene ether glycol or copolymer thereof. The reaction product, as well as the at least one polytrimethylene glycol, or copolymer thereof optionally recovered therefrom, are useful, for example, in the formation of thermoplastic elastomers, as lubricants, and as fibers for textiles.

Definitions

In this disclosure a number of terms and abbreviations are used. The following definitions are provided.

By "reaction time" or "total reaction time" is meant the time required to carry out the reaction in order to achieve the desired molecular weight not including the time to heat up the reaction mixture before the reaction and the time needed to cool down the reaction mixture after the reaction.

By "temperature range" is meant the interval between minimum and maximum temperature.

By "high-to-low temperature profile" or "high-to-low temperature ramp" is meant the function of the reaction temperature over time characterized by the average temperature during the first half of the reaction time being higher than the average temperature during the second half of the reaction time. The average temperature ($T_{average}$) within the time span from $t_1$ to $t_2$ is defined as the arithmetic mean of the temperature $T(t)$, i.e., $$T_{average} = \frac{1}{(t_2 - t_1)} \int_{t_1}^{t_2} T(t)\,dt,$$

with T indicating the reaction temperature and t the reaction time.

Figure 1A:
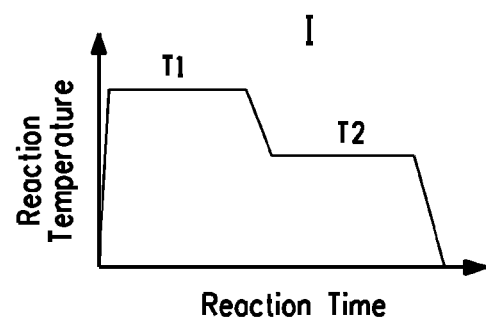
FIG. 1 shows four examples of "high-to-low temperature profiles" that can be used during a polymerization reaction to produce polytrimethylene ether glycols or copolymers thereof.
Figure 1B:
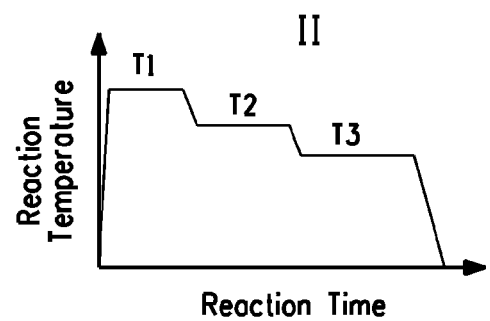
Figure 1C:
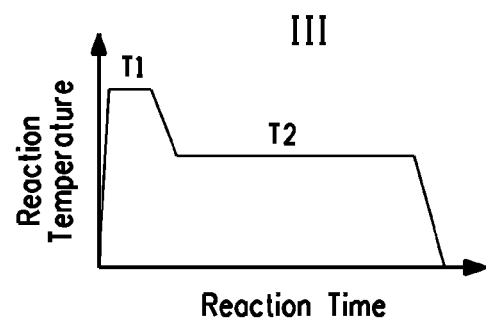
Figure 1D:
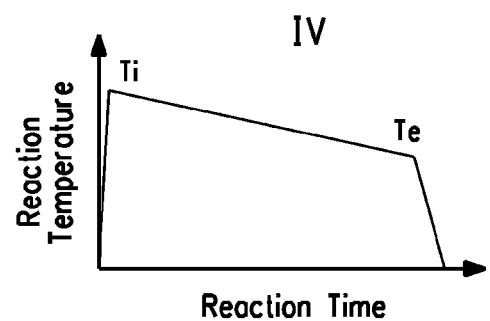

The high to low temperature profile can be carried out by ramping the temperature down in either a step-wise manner or continuously. If carried out in a step-wise manner, the reaction can be carried out with one step change in temperature or multiple step changes, wherein the time for each individual step is independent of any other step, and the rate at which the temperature is dropped between steps can vary for each step. As one example of the high to low temperature profile, one could carry out a reaction initially at 170° C. for 4 hours, and then the temperature could be lowered to 160° C. for an additional 8 hours. Additional examples for high to low temperature profiles are illustrated in plots I to IV of FIG. 1, wherein the temperatures are designated as T1 to T2 for a process involving a one step-change, T1 through T3 for a process involving two step-changes, and $T_{initial}$ ($T_i$) to $T_{end}$ ($T_e$) for a multiple step or continuous change.

By "acid catalyst" is meant an acid that promotes the condensation reaction of alcohols to ethers.

By "homogeneous acid catalyst" or "homogeneous catalyst" is meant a catalyst that is molecularly dispersed with the reactants in the same phase.

By "heterogeneous acid catalyst" or "heterogeneous catalyst" is meant a catalyst that is in a distinct second phase such as a solid.

By "polycondensation reaction" is meant a reaction carried out according to aspects of this invention wherein at least one polycondensation catalyst is used.

By "molecular weight" or "Mn" is meant the number-average molecular weight, typically reported in grams per mole, i.e., the total weight of all the polymer molecules in a sample, divided by the total number of polymer molecules in the sample.

By the terms "unsaturated end groups" or "terminal unsaturation" or "unsaturation" is meant the presence of a terminal carbon-carbon double bond (C=C) in the polymer molecule.

By "color" is meant the existence of visible color that can be quantified by using a spectrocolorimeter or a spectrophotometer in the range of visible light, using wavelengths of approximately 400-800 nm, and by comparison to pure water.

By "degree of polymerization" is meant the number of monomer units in an average polymer chain at time t in a polymerization reaction.

The present invention provides a process for producing a reaction product comprising at least one polytrimethylene ether glycol or copolymer thereof, said reaction product having a number-average molecular weight of at least about 450 g/mole, comprising:

(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst, whereby a reaction mixture is produced over a reaction time; and (b) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time; whereby a reaction product is produced.

In one embodiment of the invention, terminal unsaturation of the reaction product is reduced. In one embodiment, terminal unsaturation of the reaction product is less than or equal to about 25 meq/kg. In a more specific embodiment, terminal unsaturation of the reaction product is less than or equal to about 15 meq/kg. In an even more specific embodiment, terminal unsaturation of the reaction product is less than or equal to about 10 meq/kg.

In addition to reducing terminal unsaturation, color of the reaction product can also be reduced. Color can be determined by any suitable means, such as the determination of APHA color using ASTM standard D-1209. In one embodiment, the reaction product has a color of less than or equal to about 100 APHA units. In a more specific embodiment, the reaction product has a color of less than or equal to about 50 APHA units. In an even more specific embodiment, the reaction product has a color of less than or equal to about 25 APHA units. In one embodiment, the terminal unsaturation of the reaction product is less than or equal to about 25 meq/kg, and the color of the reaction product is less than or equal to about 100 APHA units.

In one embodiment, the molecular weight (Mn) of the reaction product is at least about 1000 g/mole. In another embodiment, the Mn of the reaction product is at least about 2000 g/mole.

The "reaction mixture" is the mixture that is produced as said reacting proceeds. In the presence of at least one polycondensation catalyst, as said reacting proceeds the at least one alkanediol reactant, and optionally the at least one comonomer diol, is converted to a reaction product comprising at least one polytrimethylene ether glycol, or copolymer thereof. In one embodiment, said reaction mixture has an Mn above at least about 450 g/mole at the end of said reacting. In addition, water is formed as said reacting occurs. Thus the reaction mixture is the mixture that would be observed at any point during the reaction time, and would comprise unreacted alkanediol, unreacted optional comonomer diol, the at least one polycondensation catalyst, the at least one polytrimethylene ether glycol or copolymer thereof that has been formed, and water.

In one embodiment of the invention, the alkanediol reactant is selected from the group consisting of 1,3-propanediol, a dimer of 1,3-propanediol, a trimer of 1,3-propanediol, and mixtures thereof. In another embodiment, the alkanediol reactant is 1,3-propanediol or a mixture of 1,3-propanediol and oligomers thereof, said mixture comprising at least 90 weight % of 1,3-propanediol. In yet another embodiment, the alkanediol reactant is 1,3-propanediol.

In one embodiment, the at least one comonomer diol is selected from the group consisting of 1,2-ethanediol, 2-methyl-1,3-propanediol, 2,2'-dimethyl-1,3-propanediol, 1-6-hexanediol, 1,7-heptanediol, 1,7-octanediol, 1,10-decanediol, and 1,12-dodecanediol. In a more specific embodiment, the comonomer diol is 1,2-ethanediol. The comonomer diol can comprise up to about 50% by weight relative to the weight of the reaction mixture.

In one broad embodiment, the process of the invention can be carried out using at least one alkanediol reactant selected from the group consisting of 1,3-propanediol, a dimer of 1,3-propanediol, a trimer of 1,3-propanediol, and mixtures thereof, and at least one comonomer diol selected from the group consisting of ethanediol, $C_4$ through $C_{12}$ straight-chain diols, and $C_3$ through $C_{12}$ branched diols. In a more specific embodiment, the process of the invention can be carried out using at least one alkanediol reactant selected from the group consisting of 1,3-propanediol, a dimer of 1,3-propanediol, a trimer of 1,3-propanediol, and mixtures thereof, and at least one comonomer diol selected from the group consisting of 1,2-ethanediol, 2-methyl-1,3-propanediol, 2,2'-dimethyl-1,3-propanediol, 1-6-hexanediol, 1,7-heptanediol, 1,7-octanediol, 1,10-decanediol, and 1,12-dodecanediol. In an even more specific embodiment, the process can be carried out using at least one alkanediol reactant selected from the group consisting of 1,3-propanediol, a dimer of 1,3-propanediol, a trimer of 1,3-propanediol, and mixtures thereof, and 1,2-ethanediol. In an even more specific embodiment, the at least one alkanediol reactant is 1,3-propanediol and the at least one comonomer diol is 1,2-ethanediol.

Thermal stabilizers, antioxidants, such as butylated hydroxyl toluene, and coloring materials may also be added to the reaction mixture or to the final polymer if necessary.

The polycondensation reaction may be carried out under an inert atmosphere, such as nitrogen or argon. In another embodiment, the polycondensation reaction is carried out at a pressure of less than one atmosphere; in additional embodiments the reaction is carried out at a pressure of less than 50 kPa or less than 25 kPa.

The at least one polycondensation catalyst can be any acid catalyst. The at least one polycondensation catalyst is preferably selected from the group consisting of Lewis acids, Bronsted acids, super acids, and mixtures thereof. Suitable polycondensation catalysts include both homogeneous and heterogeneous catalysts. In one embodiment, the suitable polycondensation catalyst is selected from the group consisting of inorganic acids, organic sulfonic acids including fluoroalkylsulfonic acids, heteropolyacids and metal salts. In a more specific embodiment, the catalyst is a homogeneous catalyst selected from the group consisting of sulfuric acid, hydriodic acid, fluorosulfonic acid, phosphorous acid, p-toluenesulfonic acid, benzenesulfonic acid, methanesulfonic acid, phosphotungstic acid, nonafluorobutanesulfonic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, and zirconium triflate. Homogeneous catalysts can also include rare earth acids of the form La(1,1,2,2,-tetrafluoroethane sulfonate)$_3$, La(1,1,2,3,3,3-hexafluoropropanesulfonates)$_3$, Sc(1,1,2,2,-tetrafluoroethane sulfonate)$_3$, Sc(1,1,2,3,3,3-hexafluoropropanesulfonates)$_3$, Ac(1,1,2,2,-tetrafluoroethane sulfonate)$_3$, Ac(1,1,2,3,3,3-hexafluoropropanesulfonates)$_3$, Yb(1,1,2,2,-tetrafluoroethane sulfonate)$_3$ and Yb(1,1,2,3,3,3-hexafluoropropanesulfonates)$_3$, as well as SbF$_5$—HF (magic acid) and mixtures of fluorosulfuric acid and antimony pentachloride, as described by G. A. Olah, G. K. Surya Prakash and J. Sommer in "Superacids" (John Wiley $ Sons, NY, 1985).

The at least one polycondensation catalyst can also be a heterogeneous catalyst selected from the group consisting of zeolites, fluorinated alumina, acid-treated alumina, heteropolyacids and heteropolyacids supported on zirconia, titania, alumina and/or silica, as well as ion exchange-based solid acid catalysts such as Amberlyst® 15 or perfluorinated ion exchange polymers.

Perfluorinated ion-exchange polymers (PFIEP) containing pendant sulfonic acid and carboxylic acid groups are well known compounds. See, for example, Waller et al., Chemtech, July, 1987, pp. 438-441, and references therein, J. D. Weaver et al., Catalysis Today, 14 (1992) 195-210 and U.S. Pat. No. 5,094,995, column 2, line 57 through column column 10, line 10 for a description of PFIEP containing pendant sulfonic acid groups, Perfluorinated ion-exchange polymers (PFIEP) containing pendant carboxylic acid groups have been described in U.S. Pat. No. 3,506,635, column 2, line 48 through column 8, line 38. PFIEP have structures that include a substantially fluorinated carbon chain that may have attached to it side chains that are substantially fluorinated. In addition, these polymers contain sulfonic acid groups or derivatives of sulfonic acid groups, carboxylic acid groups or derivatives of carboxylic acid groups and/or mixtures of these groups. For example, copolymers of a first fluorinated vinyl monomer and a second fluorinated vinyl monomer having a pendant cation exchange group or a pendant cation exchange group precursor can be used, e.g., sulfonyl fluoride groups (SO$_2$F) which can be subsequently hydrolyzed to sulfonic acid groups. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with pendant cation exchange groups or precursor groups. Preferably, the polymer contains a sufficient number of acid groups to give an equivalent weight of from about 500 to 20,000, and most preferably from 800 to 2000. Representative of the perfluorinated polymers for use in the present invention are "NAFION®" PFIEP (commercially available from E. I. du Pont de Nemours and Company), and polymers, or derivatives of polymers, disclosed in U.S. Pat. No. 3,282,875, column 1, line 17 through column 9, line 70; U.S. Pat. No. 4,329,435, column 5, lines 29 through 38; U.S. Pat. No. 4,330,654, column 4, line 55 through column 8, line 53; U.S. Pat. No. 4,358,545, column 5, lines 18 through 54; U.S. Pat. No. 4,610,762, column 3, line 25 through column 4, line 28; and U.S. Pat. No. 4,433,082, column 2, line 53 through column 8, line 25. More preferably the polymer comprises a perfluorocarbon backbone and a pendant group represented by the formula —OCF$_2$CF(CF$_3$)OCF$_2$CF$_2$SO$_3$X, wherein X is H, an alkali metal or NH$_4$. Polymers of this type are disclosed in U.S. Pat. No. 3,282,875.

Suitable heterogeneous catalysts also include porous PFIEP microcomposites comprising a PFIEP containing pendant sulfonic acid and/or carboxylic acid groups entrapped within and highly dispersed throughout a network of metal oxide, a network of silica or a network of metal oxide and silica as described in U.S. Pat. No. 5,824,622, column 3, line 22 through column 7, line 65 and column 13, line 61 through column 18, line 17.

In one preferred embodiment, the at least one polycondensation catalyst is selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange polymers.

The polycondensation catalyst loading is from about 0.01 weight percent to about 5.0 weight percent relative to the weight of the initial reaction mixture. In one embodiment the polycondensation catalyst loading is from about 0.02 weight percent to about 1.0 weight percent. In still another embodiment, the polycondensation catalyst loading is from about 0.03 weight percent to about 0.5 weight percent.

In one embodiment, the polycondensation reaction is carried out at a temperature from about 120° C. to about 250° C. with the average temperature in the first half of the reaction being 2-70° C. higher than in the second half of the reaction.

In a more specific embodiment, the polycondensation reaction is carried out at a temperature from about 120° C. to about 210° C. with the average temperature in the first half of the reaction being 2-50° C. higher than in the second half of the reaction.

In an even more specific embodiment, the polycondensation reaction is carried out at a temperature from about 140° C. to about 190° C. with the average temperature in the first half of the reaction being 2-30° C. higher than in the second half of the reaction.

In one embodiment, the reacting is carried out at a temperature of about 120° C. to about 250° C. with the average temperature in the first half of the reaction being 2-70° C. higher than in the second half of the reaction, and with at least one alkanediol reactant selected from the group consisting of 1,3-propanediol and oligomers of 1,3-propanediol having a degree of polymerization of 2-6, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture. In another embodiment, the reacting is carried out at a temperature of about 120° C. to about 250° C. with the average temperature in the first half of the reaction being 2-70° C. higher than in the second half of the reaction, and with at least one alkanediol reactant selected from the group consisting of 1,3-propanediol and oligomers of 1,3-propanediol having a degree of polymerization of 2-6, at least one comonomer diol selected from the group consisting of ethanediol, $C_4$ through $C_{12}$ straight-chain diols, and $C_3$ through $C_{12}$ branched diols, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture.

The time for the reaction will depend on many factors, such as the reactants, reaction conditions and reactor. One skilled in the art will know to adjust the time for the reaction to achieve high yields of a reaction product having a desired molecular weight.

The process of this invention is not limited by reactor configuration, however a successful manufacturing process for polytrimethylene ether glycol should provide the product within a desired time and under conditions to achieve the average molecular weight for end use applications and to limit the production of undesired chemical species that would make the product unsuitable for end use applications or that would require costly measures to remove, for example product having high degree of unsaturation or high color. Reactor configurations, as well as a continuous process for polycondensation of 1,3-propanediol reactant, are described in U.S. Pat. No. 6,720,459, Column 5, line 49 through Column 9, line 26, and FIGS. 1 through 6. The present process can be carried out in a closed system with no fresh monomer being added over the course of the reaction. The reaction can also be carried out with fresh monomer being added to the reaction mixture and/or reaction product being withdrawn from the reaction mixture over the course of the reaction. The latter can be used to achieve a continuous reaction process. In addition, the "high-to-low" temperature profile can be carried out within one reactor or reactor zone, or in multiple reactors or zones of a reactor. For example, the polycondensation reaction can be initiated in one reactor or reactor zone, and as the temperature is modified (for example, decreased) to achieve the "high-to-low" profile, the reaction mixture can be transferred to a different reactor or reactor zone. The number of reactors, or reaction zones within a reactor, will be determined in part by the cost of the reactor(s) and the temperature profile of the reaction.

When the reaction is terminated, for example when the reaction product has achieved the desired molecular weight, the at least one polytrimethylene glycol or copolymer thereof in the reaction product can be recovered by methods known in the art, such as extraction. The at least one polycondensation catalyst can be recovered and reused in a subsequent polycondensation reaction.

General Materials and Methods

The following abbreviations are used:
Nuclear magnetic resonance is abbreviated NMR; degrees Celsius is abbreviated ° C.; Celsius is abbreviated C; gram is abbreviated g, kilogram is abbreviated kg, milliliter(s) is abbreviated mL; cubic centimeter is abbreviated cc; liter is abbreviated L; millimeter is abbreviated mm; centimeter is abbreviated cm; revolutions per minute is abbreviated rpm; minute(s) is abbreviated min; parts per million is abbreviated ppm; number-average molecular weight is abbreviated Mn; proportional integral derivative is abbreviated PID; hour(s) is abbreviated hr(s); weight percent is abbreviated wt %; reaction is abbreviated react.; temperature is abbreviated temp.; milliequivalents is abbreviated meq; grams per mole is abbreviated g/mole; 1,3-propanediol is abbreviated PDO; and 1,1,2,2-tetrafluoroethanesulfonic acid is abbreviated TFESA;

The polymer molecular weight (Mn) and polymer unsaturation were determined by Proton-NMR using a 500 or 600 MHz Avance NMR spectrometer (Bruker, Rheinstetten, Germany). Polymer color was measured according to ASTM standard D-1209 as APHA values (Platinum-Cobalt system) using standard instruments such as a spectrocolorimeter (Type "ColorQuest", Hunterlab, Reston, Va., USA) or a spectrophotometer (Type "50 Conc", Varian Inc., Palo Alto, Calif., USA).

Chemicals were generally obtained from Sigma-Aldrich (St. Louis, Mo., USA) unless otherwise indicated. 1,1,2,2-Tetrafluoroethanesulfonic acid (TFESA) was prepared as described in: M. A. Harmer et al., Green Chemistry, 2007, 9, 30-37. 1,3-Propanediol was either from E.I. DuPont de Nemours and Company (Wilmington, Del., USA) or Sigma-Aldrich.

Reactions in 100 mL Round Bottom Flask

The polymerization reaction was carried out in a 100 mL custom-made glass flask. The flask was a modified heavy wall, round bottom, 3-neck flask with 20 degree angled side necks. In place of one of the side necks, the flask had a thermal well with an inner diameter of 6 mm to accommodate a thermal couple. In place of the other side neck, the flask had a gas sparging tube with a barbed hose connection inlet and an inner diameter of 6 mm. Both the gas sparging tube and the thermal well extended down to 5 mm above the bottom of the flask. To the center neck of the flask was attached a glass column with a length of 250 mm and an internal diameter of 12.5 mm. A 40.64 cm (16 inch) long type-J thermocouple was secured to the outside of the column, and a ribbon-type heating element was wrapped in a spiral pattern around the column with approximately 2.54 cm (1 inch) between wraps, in such a way that the tip of the thermocouple was between the two lowermost wraps of the heating element. Fiberglass insulating tape was then wrapped around the column, leaving none of the column or the heating element exposed. To the top of the column was attached a glass distilling head with a water jacketed sidearm and vacuum adapter. To the outlet of the distilling head was attached a 15 mL distillate receiver. Latex tubing was used to connect a dual-reservoir oil bubbler to the vacuum adapter on the distillation head to allow the system to be continuously purged with inert gas. A hemispherical heating mantle was used to heat the flask. A 30.48 cm (12-inch) long type-J thermocouple was used to monitor the temperature of the flask contents. The tip of the thermocouple was inserted into the thermal well on the flask, to which a small amount of heat transfer fluid was added. Two control loops were used to heat the reaction vessel and its contents to the desired temperature. In the first control loop, the 30.48 cm thermocouple inserted into the thermal well was used to measure indirectly the temperature of the flasks' contents. This temperature was fed back to a PID controller, which controlled the hemispherical heating mantle. In the second control loop, the 40.64 cm thermal couple secured to the column was used to measure the temperature of the vapor in the column. This temperature was fed back to another PID controller, which controlled the ribbon-type heating element wrapped around the column.

Reactions in 1 Liter Glass Reactor

A 1 Liter glass reactor equipped with a mechanical stirrer, a nitrogen dip tube tipped with a glass fritted sparger and an over head condenser unit was used. To the reactor was added the diol monomer and the acid catalyst. The reaction mixture was then mixed using the stirrer and sparged using nitrogen gas to remove residual oxygen. The reaction was heated to the desired reaction temperature(s) using a hot oil circulation system. The start time was set once the reaction reached temperature. As the reaction approached the target temperature, water from the reaction evolved from the reactor and was removed by the condenser. The reactions were terminated by cooling the reaction mixtures to room temperature.

EXAMPLES

Examples 1 and 2 exemplify the synthesis of a reaction product comprising polytrimethylene ether glycol. Example 1 (comparative example) was carried out at constant temperature, whereas Example 2 was carried out using a high-to-low temperature ramp. The reaction conditions and results are summarized in Table 1.

Example 1 (Comparative Example)

1,3-Propanediol (30 g) was placed in a 100 mL round bottom flask. To this was added TFESA (0.3 g in the final solution). The contents were purged with nitrogen gas for 6 hours. The solution was heated using an oil bath at 170° C. under a nitrogen atmosphere for 4 hours. Water vapor was slowly evolved and collected in a condenser. The molecular weight (Mn) was 1850 g/mole and the concentration of unsaturated end groups was 21 meq/kg.

Example 2

1,3-Propanediol (30 g) was placed in a 100 mL round bottom flask. To this was added TFESA (0.3 g in the final solution) and the contents were purged with nitrogen gas for 6 hours. The homogeneous solution was heated using an oil bath at 170° C. under a nitrogen atmosphere for 3 hours. The temperature was then reduced to 125° C. and heating continued for 16 hours. Water was slowly evolved and collected in a condenser. The molecular weight (Mn) was 2391 g/mole and the concentration of unsaturated end groups was 9 meq/kg. As can be seen from Table 1, this is a 57% reduction in unsaturated end groups compared to the constant temperature profile used in comparative Example 1.

TABLE 1

|  | (unit) | Comparative Example 1 | Example 2 |
|---|---|---|---|
| Catalyst | — | TFESA | TFESA |
| Catalyst loading | (wt %) | 1 | 1 |
| Temperature profile | — | constant | high-to-low |
| Time segment 1 | (T in ° C./t in hrs) | 170/4 | 170/3 |
| Time segment 2 | (T in ° C./t in hrs) | — | 125/16 |
| Molecular weight (Mn) | (g/mole) | 1850 | 2391 |
| Unsaturated end groups | (meq/kg) | 21 | 9 |

T = temperature;
t = time.

Example 3

This example illustrates the synthesis of a reaction product comprising polytrimethylene ether glycols having low color and low terminal unsaturation using a high-to-low temperature profile at 3 temperature levels.

1,3-Propanediol (30 g) was placed in a 100 mL round bottom flask. To this was added 1,1,2,2-tetrafluoroethane-sulfonic acid (0.135 g in the final solution). The contents were purged with nitrogen for 18 hours. The homogeneous solution was heated using an oil bath at 175° C. under a nitrogen atmosphere for about 2 hours with 3 mL of water collected. The temperature was then reduced to 158° C. for about 2 hours with 4.75 mL of water collected. The temperature was then reduced to 143° C. for about 16 hours with 4.75 mL of water collected. The molecular weight of the reaction product was 1850 g/mole with a concentration of unsaturated ends of 4 meq/kg and an APHA color of 30. As can be seen from Table 2, this is an 80% reduction in unsaturated end groups compared to the constant temperature profile used in comparative Example 1.

TABLE 2

|  | (unit) | Comparative Example 1 | Example 3 |
|---|---|---|---|
| Catalyst | — | TFESA | TFESA |
| Catalyst loading | (wt %) | 1 | 0.45 |
| Temperature profile | — | constant | high-to-low |
| Time segment 1 | (T in ° C./t in hrs) | 170/4 | 175/2 |
| Time segment 2 | (T in ° C./t in hrs) | — | 158/2 |

TABLE 2-continued

| | (unit) | Comparative Example 1 | Example 3 |
|---|---|---|---|
| Time segment 3 | (T in ° C./t in hrs) | — | 143/16 |
| Molecular weight (Mn) | (g/mole) | 1850 | 1850 |
| Unsaturated end groups | (meq/kg) | 21 | 4 |

T = temperature;
t = time.

Example 4

This example illustrates the synthesis of a reaction product comprising polytrimethylene ether glycol of high molecular weight (Mn>3000 g/mole) and low unsaturation (<5 meq/kg) using a high-to-low temperature profile.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 100 mL/min for 12 hours. The homogeneous solution was then heated with a heating mantle to 155° C. for about 22 hours (with 4.65 mL of water collected). The temperature of the solution was then reduced to 135° C. for 16 hours. Nitrogen sparging was continued throughout the duration of the reaction. The molecular weight (Mn) of the product was 3039 g/mole with 4 meq/kg of unsaturated end groups and an APHA color of 554.

Example 5

This example illustrates the synthesis of a reaction product comprising polytrimethylene ether glycol of high molecular weight (Mn>2000 g/mole) and low unsaturation (<10 meq/kg) using a high-to-low temperature profile employing 3 temperature steps.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 100 mL/min for 12 hours. The homogeneous solution was then heated with a heating mantle to 170° C. for about 4.5 hours (with 3.2 mL of water collected). The temperature of the solution was then reduced to 155° C. for about 6 hours (with 5.0 mL of water collected). The temperature of the solution was then reduced to 135° C. for 16 hours. Nitrogen sparging was continued throughout the duration of the reaction. The molecular weight (Mn) of the product was 2110 g/mole with 8 meq/kg of unsaturated end groups and an APHA color of 86.

Example 6

This example demonstrates the synthesis of a reaction product comprising polytrimethylene ether glycol of high molecular weight (Mn>2900 g/mole) and low unsaturation (<10 meq/kg) using a high-to-low temperature profile employing 3 temperature steps.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 200 mL/min for 12 hours. The homogeneous solution was then heated with a heating mantle to 170° C. for about 4 hours (with 3.00 mL of water collected). The temperature of the solution was then reduced to 155° C. for about 7 hours (with 5.00 mL of water collected). The temperature of the solution was then reduced to 135° C. for 16 hours. Nitrogen sparging was continued throughout the duration of the reaction. The molecular weight (Mn) of the product was 2967 g/mole with 9 meq/kg of unsaturated end groups and an APHA color of 128.

Example 7

This example demonstrates the synthesis of a reaction product comprising polytrimethylene ether glycol of high molecular weight (Mn>3100 g/mole), low unsaturation (<10 meq/kg) and low color (<30 APHA units) using a high-to-low temperature profile employing 3 temperature steps and using wet nitrogen addition.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 200 mL/min for 12 hours. The nitrogen gas was bubbled through water with a fine porosity gas dispersion tube prior to being bubbled into the flask. The homogeneous solution was then heated with a heating mantle to 170° C. for about 4 hours (with 9.50 mL of water collected). The temperature of the solution was then reduced to 155° C. for about 7 hours (with 13.90 mL of water collected). The temperature of the solution was then reduced to 135° C. for 16 hours. Wet nitrogen sparging was continued throughout the duration of the reaction. The molecular weight (Mn) of the product was 3141 g/mole with 9 meq/kg of unsaturated end groups and an APHA color of 27.

Table 3 provides a summary of the reaction conditions and results for Examples 6 and 7.

TABLE 3

| | (unit) | Example 6 | Example 7 |
|---|---|---|---|
| Catalyst | — | TFESA | TFESA |
| Catalyst loading | (wt %) | 0.5 | 0.5 |
| Nitrogen type | | dry | Wet |
| Temperature profile | — | high-to-low | high-to-low |
| Time segment 1 | (T in ° C./t in hrs) | 170/4 | 170/4 |
| Time segment 2 | (T in ° C./t in hrs) | 155/7 | 155/7 |
| Time segment 3 | (T in ° C./t in hrs) | 135/16 | 135/16 |
| Total reaction time | (hrs) | 27 | 27 |
| Molecular weight (Mn) | (g/mole) | 2967 | 3141 |
| Unsaturated end groups | (meq/kg) | 9 | 9 |
| Color | (APHA units) | 128 | 27 |

T = temperature;
t = time.

Example 8

This example demonstrates the synthesis of a reaction product comprising polytrimethylene ether glycol of high molecular weight (Mn>3400 g/mole), low unsaturation (<15 meq/kg) and low color (<30 APHA units) using a high-to-low temperature profile employing 3 temperature steps and using wet nitrogen addition.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 200 mL/min for 12 hours. The nitrogen gas was bubbled through water with a fine porosity gas dispersion tube prior to being bubbled into the flask. The homogeneous solution was then heated with a heating mantle to 170° C. for about 4 hours (with 6.65 mL of water collected). The temperature of the solution was then reduced to 155° C. for about 7 hours (with 9.80 mL of water collected). The temperature of the solution was then reduced to 140° C. for 6 hours. Wet nitrogen sparging was continued throughout the duration of the reaction. The molecular weight (Mn) of the product was 3479 g/mole with 12 meq/kg of unsaturated end groups and an APHA color of 28.

Example 9

This example demonstrates the synthesis of a reaction product comprising polytrimethylene ether glycol of medium molecular weight (Mn~1200 g/mole), low unsaturation (<10 meq/kg) and low color (<15 APHA units) using a high-to-low temperature profile employing 3 temperature steps and using wet nitrogen addition.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 200 mL/min for 12 hours. The nitrogen gas was bubbled through water with a fine porosity gas dispersion tube prior to being bubbled into the flask. The homogeneous solution was then heated with a heating mantle to 170° C. for about 4 hours (with 7.05 mL of water collected). The temperature of the solution was then reduced to 158° C. for about 3.75 hours (with 9.15 mL of water collected). The temperature of the solution was then reduced to 140° C. for 6 hours. Wet nitrogen sparging was continued throughout the duration of the reaction. The molecular weight (Mn) of the product was 1170 g/mole with 8 meq/kg of unsaturated end groups and an APHA color of 14.

Example 10

This example demonstrates the synthesis of a reaction product comprising polytrimethylene ether glycol of medium molecular weight (Mn~1200 g/mole), low unsaturation (<10 meq/kg) and low color (<15 APHA units) using a high-to-low temperature profile employing 3 temperature steps and using dry nitrogen addition.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 200 mL/min for 12 hours. The homogeneous solution was then heated with a heating mantle to 170° C. for about 4 hours (with 3.30 mL of water collected). The temperature of the solution was then reduced to 158° C. for about 3.75 hours (with 5.15 mL of water collected). The temperature of the solution was then reduced to 140° C. for 6 hours. Nitrogen sparging was continued throughout the duration of the reaction. The molecular weight (Mn) of the product was 1164 g/mole with 8 meq/kg of unsaturated end groups and an APHA color of 13.

Example 11

This example demonstrates the synthesis of a reaction product comprising polytrimethylene ether glycol of high molecular weight (Mn>2000 g/mole), low unsaturation (<15 meq/kg) and low color (<20 APHA units) using a high-to-low temperature profile employing 3 temperature steps and using wet nitrogen addition.

1,3-Propanediol (30 g) was added to a 100 mL round bottom flask. To this was added 1,1,2,2-tetrafluoroethane-sulfonic acid (0.15 g). The contents of the flask were sparged with nitrogen gas at 200 mL/min for 12 hours. The nitrogen gas was bubbled through water with a fine porosity gas dispersion tube prior to being bubbled into the flask. The homogeneous solution was then heated with a heating mantle to 170° C. for about 4 hours (with 6.30 mL of water collected). The temperature of the solution was then reduced to 155° C. for about 7 hours (with 9.90 mL of water collected). The temperature of the solution was then reduced to 140° C. for 4 hours. Wet nitrogen sparging was continued throughout the duration of the reaction. The molecular weight (Mn) of the product was 2139 g/mole with 12 meq/kg of unsaturated end groups and an APHA color of 20.

Examples 12 and 13 exemplify the production of a reaction product comprising polytrimethylene ether glycol at constant temperature and using a high-to-low temperature profile, respectively; the reactions were performed in a one liter reactor.

Example 12 (Comparative Example)

A 1 liter glass reactor equipped with a mechanical stirrer, a nitrogen dip tube tipped with a glass fritted sparger and an over head condenser unit was sparged with nitrogen gas. To the reactor was added 450 grams of 1,3-propanediol and 2.25 grams of the acid catalyst TFESA. The reaction mixture was then mixed using the stirrer and sparged using nitrogen gas to remove residual oxygen. The reaction was heated to the desired reaction temperature(s) using a hot oil circulation system. The start time was set once the reaction reached temperature. As the reaction approached the target temperature, water from the reaction evolved from the reactor and was removed by the condenser. The reactions were terminated by cooling the reaction mixtures to room temperature. The reaction was heated for a total of 10 hours at a single temperature of 170° C. At the end of the experiment the polyether product was analyzed and found to have a molecular weight of 2865 g/mole and unsaturated end groups of 40 meq/kg.

Example 13

A 1 liter glass reactor equipped with a mechanical stirrer, a nitrogen dip tube tipped with a glass fritted sparger and an over head condenser unit was sparged with nitrogen gas. To the reactor was added 450 grams of 1,3-propanediol and 2.25 grams of the acid catalyst TFESA. The reaction mixture was then mixed using the stirrer and sparged using nitrogen gas to remove residual oxygen. The reaction was heated to the desired reaction temperature(s) using a hot oil circulation system. The start time was set once the reaction reached temperature. As the reaction approached the target temperature, water from the reaction evolved from the reactor and was removed by the condenser. The reactions were terminated by cooling the reaction mixtures to room temperatures. The reaction was heated for a total of 15 hours. The reaction was heated initially to 170° C. Once the polymer molecular weight was about 274 g/mole and unsaturated end groups about 10 meq/kg, the reaction was allowed to cool to 158° C. and then run at this temperature for the remaining reaction time. At the end of the experiment the polyether product was analyzed and found to have a molecular weight of 3306 g/mole and unsaturated end groups of 21 meq/kg.

Table 4 summarizes the reaction conditions and the results of Examples 12 and 13. It can be seen from Table 4 that in Example 13, where a high-to-low temperature profile was applied, that the final concentration of unsaturated end groups is lower than in the comparative Example 12, conducted at a single constant temperature. This occurred even though the final polymer molecular weight was higher in this inventive example than in comparative Example 12. Typically, unsaturated end groups increase as the polymer molecular weight increases.

TABLE 4

|  | (unit) | Comparative Example 12 | Example 13 |
|---|---|---|---|
| Catalyst | — | TFESA | TFESA |
| Catalyst loading | (wt %) | 0.5 | 0.5 |
| Temperature profile | — | constant | high-to-low |
| Time segment 1 | (T in ° C./t in hrs) | 170/10 | 170/5 |
| Time segment 2 | (T in ° C./t in hrs) | — | 158/10 |
| Molecular weight (Mn) | (g/mole) | 2865 | 3306 |
| Unsaturated end groups | (meq/kg) | 40 | 21 |
| Color | (APHA units) | 3660 | 1753 |

T = temperature;
t = time.

Examples 14 and 15 exemplify the synthesis of a reaction product comprising a copolymer of polytrimethylene ether glycol. Example 14 (comparative example) was carried out at a constant temperature, and Example 15 was carried out using a high-to-low-temperature profile.

Example 14 (Comparative Example)

A mixture of 1,3-propanediol (75 mole %, 629 g) and 1,2-ethanediol (25 mole %, 171 g) was added to a 1 L cylindrical flask. To this was added 1,1,2,2-tetrafluoroethanesulfonic acid (4.0 g). The contents of the flask were sparged with nitrogen gas at a rate of 500 mL/min for 12 hours. The homogeneous solution was heated with a heating mantle to 170° C. for 15 hours. Agitation was accomplished with a stir shaft rotating at 300 rpm. Water evolved during the reaction was removed from the reaction vessel via a heated column leading to a condenser. Nitrogen sparging was continued throughout the duration of the reaction. The molecular weight (Mn) of the product was 1641 g/mole with 25 meq/kg of unsaturated end groups and an APHA color of 5232.

Example 15

A mixture of 1,3-propanediol (75 mole %, 629 g) and 1,2-ethanediol (25 mole %, 171 g) was added to a 1000 mL cylindrical flask. To this was added 1,1,2,2-tetrafluoroethanesulfonic acid (4.0 g). The contents of the flask were sparged with nitrogen gas at 500 mL/min for 12 hours. The homogeneous solution was heated with a heating mantle to 170° C. for 9.5 hours. The temperature of the solution was then reduced to 155° C. for 12 hours. Agitation was accomplished with a stir shaft rotating at 300 rpm. Water evolved during the reaction was removed from the reaction vessel via a heated column leading to a condenser. Nitrogen sparging was continued throughout the duration of the reaction. The molecular weight (Mn) of the product was 1744 g/mole with 17 meq/kg of unsaturated end groups and an APHA color of 1159.

Table 5 summarized the reaction conditions and results for Examples 14 and 15. The results in Table 5 show that a copolymer of polytrimethylene ether glycol with reduced color and unsaturation can be achieved when employing a high-to-low temperature profile when compared to a single constant reaction temperature.

TABLE 5

|  | (unit) | Comparative Example 14 | Example 15 |
|---|---|---|---|
| Catalyst | — | TFESA | TFESA |
| Catalyst loading | (wt %) | 0.5 | 0.5 |
| PDO fraction | (mole %) | 75 | 75 |
| Temperature profile | — | constant | high-to-low |
| Time segment 1 | (T in ° C./t in hrs) | 170/15 | 170/9.5 |
| Time segment 2 | (T in ° C./t in hrs) | — | 155/12 |
| Molecular weight Mn | (g/mole) | 1641 | 1744 |
| Unsaturated end groups | (meq/kg) | 25 | 17 |
| Color | (APHA units) | 5232 | 1159 |

T = temperature;
t = time.

We claim:

1. A process for producing a reaction product comprising at least one polytrimethylene ether glycol or copolymer thereof, said reaction product having a number-average molecular weight of at least about 450 g/mole, comprising:
    (a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst, whereby a reaction mixture is produced over a reaction time; and
    (b) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time;
    whereby a reaction product is produced.

2. The process of claim 1, where the at least one alkanediol reactant is selected from the group consisting of 1,3-propanediol, a dimer of 1,3-propanediol and a trimer of 1,3-propanediol.

3. The process of claim 1 or claim 2, wherein the at least one comonomer diol is selected from the group consisting of 1,2-ethanediol, 2-methyl-1,3-propanediol, 2,2'-dimethyl-1,3-propanediol, 1-6-hexanediol, 1,7-heptanediol, 1,7-octanediol, 1,10-decanediol, and 1,12-dodecanediol.

4. The process of claim 1, wherein the at least one alkanediol reactant is 1,3-propanediol, and the at least one comonomer diol is 1,2-ethanediol.

5. The process of claim 1, wherein said controlling is carried out at a temperature of about 120° C. to about 210° C. with the average temperature in the first half of the reaction time being between 2° C. and about 50° C. higher than in the second half of the reaction time.

6. The process of claim 5, wherein said controlling is carried out at a temperature of about 140° C. to about 190° C. with the average temperature in the first half of the reaction time being between 2° C. and about 30° C. higher than in the second half of the reaction time.

7. The process of claim 1, wherein the at least one polycondensation catalyst is selected from the group consisting of inorganic acids, organic sulfonic acids including fluoroalkylsulfonic acids, metal salts, zeolites, fluorinated alumina, acid-treated alumina, heteropolyacids, heteropolyacids supported on zirconia, titania, alumina and/or silica, and ion exchange-based solid acid catalysts.

8. The process of claim 7, wherein the at least one polycondensation catalyst is selected from the group consisting of sulfuric acid, hydriodic acid, fluorosulfonic acid, phosphorous acid, p-toluenesulfonic acid, benzenesulfonic acid, methanesulfonic acid, phosphotungstic acid, nonafluorobutanesulfonic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, zirconium triflate, La(1,1,2,2,-tetrafluoroethane sulfonate)$_3$, La(1,1,2,3,3,3-hexafluoropropanesulfonates)$_3$, Sc(1,1,2,2,-tetrafluoroethane sulfonate)$_3$, Sc(1,1,2,3,3,3-hexafluoropropanesulfonates)$_3$, Ac(1,1,2,2,-tetrafluoroethane sulfonate)$_3$, Ac(1,1,2,3,3,3-hexafluoropropanesulfonates)$_3$, Yb(1,1,2,2,-tetrafluoroethane sulfonate)$_3$, Yb(1,1,2,3,3,3-hexafluoropropanesulfonates)$_3$, SbF$_5$—HF, mixtures of fluorosulfuric acid and antimony pentachloride, perfluorinated ion-exchange polymers, and microcomposites comprising perfluorinated ion-exchange polymers.

9. The process of claim 1 or claim 8, wherein the at least one polycondensation catalyst is used at a concentration of about 0.01% to about 5.0% by weight relative to the weight of the initial reaction mixture.

10. The process of claim 1, wherein the process is carried out under an inert atmosphere.

11. The process of claim 1, wherein the unsaturation of the reaction product is less than or equal to about 25 meq/kg.

12. The process of claim 1, wherein the number-average molecular weight of the reaction product is at least about 1000 g/mole.

13. The process of claim 12, wherein the number-average molecular weight of the reaction product is at least about 2000 g/mole.

14. The process of claim 1, wherein the reaction product has a color of less than or equal to about 100 APHA units.

15. The process of claim 1, wherein said reacting is carried out at a temperature of about 120° C. to about 250° C. with the average temperature in the first half of the reaction being 2-70° C. higher than in the second half of the reaction, with at least one alkanediol reactant selected from the group consisting of 1,3-propanediol and oligomers of 1,3-propanediol having a degree of polymerization of 2-6, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture.

16. The process of claim 1, wherein the temperature is first kept at a first constant temperature during a first time period of the total reaction time, then lowered to a second temperature and kept at the second temperature for a second time period, and optionally changing the temperature again after said second time period in a way that the average temperature during the first half of the total reaction time is higher than the average temperature during the second half of the total reaction time.

17. The process of claim 16, where the number-average molecular weight (Mn) is in the range of about 130 to about 1500 g/mole before lowering the temperature from the first temperature to the second temperature.

18. The process of claim 17, where the number-average molecular weight (Mn) is in the range of about 200 to about 750 g/mole before lowering to temperature from the first temperature to the second temperature.

19. The process of claim 18 where the number-average molecular weight (Mn) is in the range of about 200 to about 500 g/mole before lowering to temperature from the first temperature to the second temperature.

20. A process for producing a reaction product comprising at least one polytrimethylene ether glycol or copolymer thereof, said reaction product having a number-average molecular weight of at least about 450 g/mole, comprising:
  (a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, C$_4$ through C$_{12}$ straight-chain diols, and C$_3$ through C$_{12}$ branched diols; and (3) at least one polycondensation catalyst, whereby a reaction mixture is produced over a reaction time;
  (b) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time; whereby a reaction product is produced; and
  (c) recovering at least one polytrimethylene glycol or copolymer thereof from the reaction product of (b).

\* \* \* \* \*